AUTOMATIC LOCKOUT PARTY LINE TELEPHONE SYSTEM
Filed Feb. 9, 1966
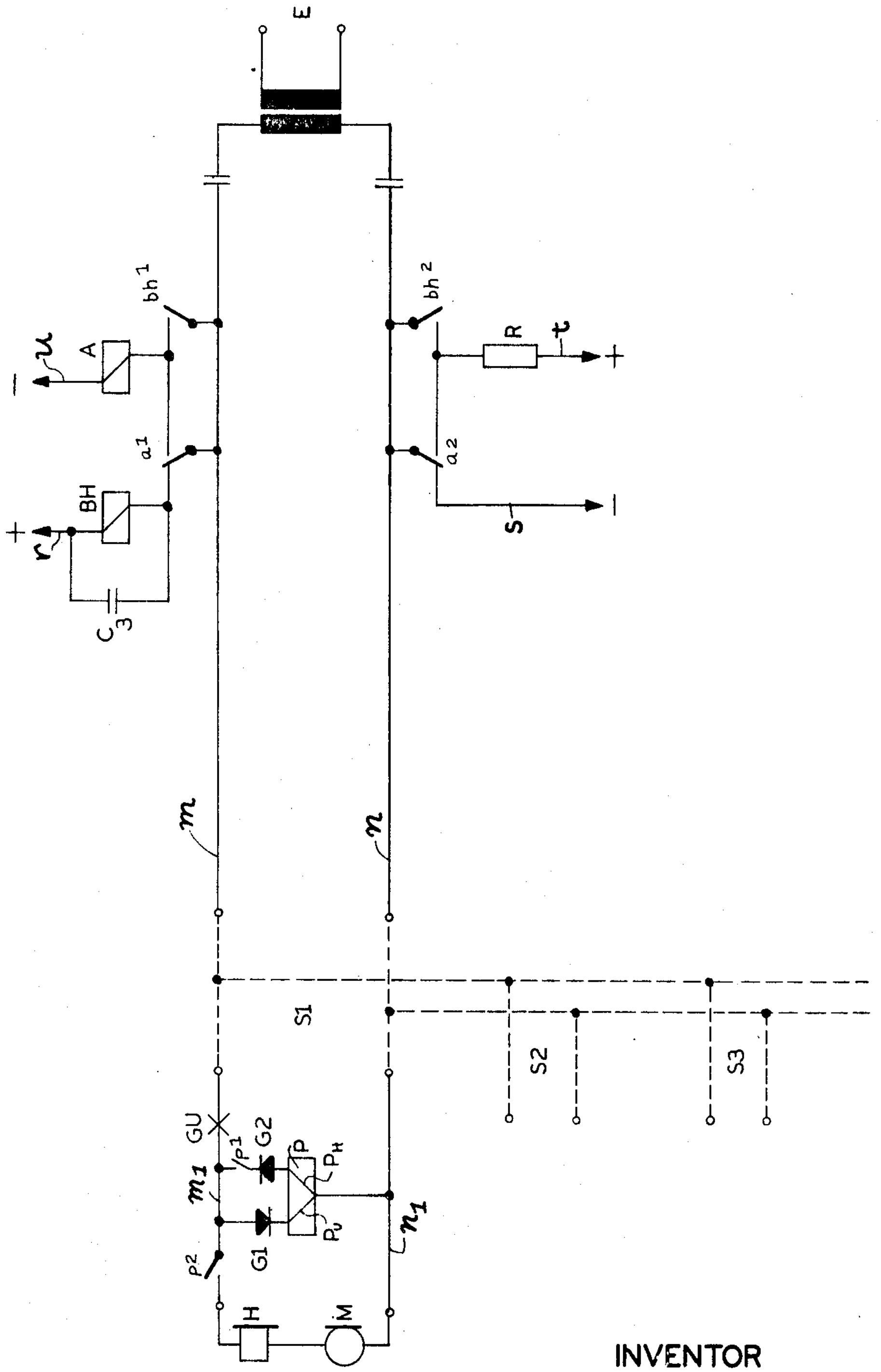
INVENTOR
CARL-HEINZ JESKE
BY Wolf, Greenfield & Hieken
ATTORNEYS United States Patent Office 3,467,784

Patented Sept. 16, 1969

3,467,784
AUTOMATIC LOCKOUT PARTY LINE TELEPHONE SYSTEM

Carl-Heinz Jeske, Munich, Germany, assignor to Sud-Atlas-Werke G.m.b.H., a corporation of Germany Filed Feb. 9, 1966, Ser. No. 526,082
Int. Cl. H04m 3/56
U.S. Cl. 179—17 4 Claims

ABSTRACT OF THE DISCLOSURE

A number of like transmitters are coupled in parallel across a pair of signal conductors. When one of the transmitters is conditioned to use the pair of signal conductors, a difference in potential of predetermined polarity is applied between the signal conductors to signal other transmitters that this pair of signal conductors is being used.

The invention relates to an arrangement for transmitting messages by wire having several transmitting apparatus, one transmitting apparatus being connected to a receiving apparatus by so-called use testing means arranged to disable the use testing means for all other transmitting apparatus.

The known arrangements of this type have the disadvantage that at least three conductors are necessary to accomplish both signal transmission and use testing. Consequently, it is an important object of this invention to accomplish both use testing and signal transmission with but two conductors. In order to achieve this all subscribers are connected in parallel and the use testing procedure is undertaken on their common pair of conductors over which the signals are transmitted. When use testing it must be determined whether the two-conductor transmission line is free or busy. If it is free, it may be used for the subscriber, and if it is busy, the subscriber must not be able to use the occupied line.

To accomplish this and other objects the use testing as well as the following signal transmission takes place over two conductors between which a difference in potential of given polarity (free line signal potential) exists at least for a time interval before the use testing, and a difference in potential of reversed polarity (busy potential) is across both conductors upon initiating use testing. A holding circuit may be prepared by the use testing current which, after causing the closing of the contact to the associated transmitting apparatus, flows from the use testing potential and establishes the signal connection. The holding circuit receives current if the potential across the signal conductors reverses polarity.

Further features, objects and advantages of this invention will be apparent to those skilled in the art from consideration of the following description taken in connection with the accompanying drawing, the single figure of which is a schematic circuit diagram of apparatus according to this invention.

Several like transmitting apparatus $S_1$, $S_2$, $S_3$, of which only the transmitting apparatus $S_1$ is shown in detail in the drawing are coupled in parallel across a pair of conductors *m*, *n* to a receiving apparatus E. A receiver H and a microphone transmitter M are disposed between conductors *m*1 and *n*1 coupled to the signal conductors *m* and *n*, respectively. The conductor *m*1 in the transmitting apparatus $S_1$ may be selectively interrupted by the hook switch GU and a contact *p*2 of a testing relay P disposed in the transmitting apparatus. This relay P is provided with a working or use testing coil $P_U$ coupled in series with rectifier G1 between conductors *m*1 and *n*1. Rectifier G1 is poled to transmit exciting current through the coil $P_U$ when the potential of conductor *m*1 is positive with respect to the potential of conductor *n*1. Further, the testing relay P is provided with a holding winding $P_H$ connected in series with rectifier G2 between conductors *m*1 and *n*1. Rectifier G2 is poled opposite to rectifier G1 so that a holding contact *p*1 of the testing relay P closes as soon as the use testing coil $P_U$ of the relay is energized. Simultaneously the relay contact *p*2 closes to complete use testing and condition transmitting apparatus $S_1$ to use conductors *m* and *n*.

In order to prevent other transmitting apparatus from then being conditioned to use lines *m* and *n*, a difference in potential of reversed polarity is applied between conductors *m*, *n*. The holding circuit mentioned above of the relay P continues to operate that relay because holding current still flows through contact *p*1, rectifier G2 and holding winding $P_H$.

For reversal of the potential polarity the following circuitry is provided in the illustrated embodiment.

The free line potential is delivered by a line supply means which delivers +24 volts over a line *r* to the conductor *m* and —24 volts over a line *s* to the conductor *n*.

The busy potential of opposite polarity is delivered by the line supply means as well which delivers +24 volts to the conductor *n* over a line *t* and delivers —24 volts to the conductor *m* over a line *u*.

In order to undertake this reversal of polarity relay contacts are provided in the lines *r*, *s*, *t* and *u*, said relay contacts belonging to a busy auxiliary relay BH and a switching-in relay A. The busy auxiliary relay BH is disposed within the line *r* and during the use testing receives use testing current over a relay contact *a*1 of the switching-in relay A. This relay BH is bridged over a condenser C3 so that it operates after a short delay. After this short delay the associated relay contacts *bh*1 and *bh*2 are closed in the lines *u* and *t*. With that the reversal of potential polarity is prepared but is only performed when the relay contacts *a*1 and *a*2 of the switching-in relay A in the lines *r* and *s* open as relay A operates.

In the meantime transient currents flow over the lines *r* and *u* and the lines *s* and *t*. The transient currents are practically limited by suitable resistances in the circuits *r*, *u* and *s*, *t*. In the embodiment shown in the drawing an ohmic resistance R is provided in the line *t* while in the lines *r* and *u* the current is limited by the winding resistances of relays BH and A.

For certain purposes, especially for giving signals over the signal conductors it may be suitable to disconnect the connection between the transmitting apparatus and one of the two signal conductors *m* or *n*. In order to maintain the busy condition despite this disconnecting the current flux in the relay P must be maintained. To this end the side of the relay P which is cut off by the disconnection is connected to ground or to another potential to insure that the necessary holding current flows in the relay P. In the embodiment shown in which balanced free line signals and busy potentials are present the testing relay P may preferably be connected to ground which in this case has the voltage of 0 volts.

The testing relay P functions as follows.

Both the use testing winding $P_U$ and the holding winding $P_H$ of the relay are arranged so that they create a curent flow in the same direction. Moreover, a delay in releasing arises by the current flowing over the rectifiers between the two windings, said delay bridging over the time of potential reversal between the signal conductors *m* and *n*. Thereby the reliability of the procedure is increased. Especially possible variations in current become neutralized which arise when relays BH and A react and cannot cause an intermittent releasing of the testing relay.

From the foregoing description those skilled in the art will appreciate that numerous modifications may be made of this invention without departing from its spirit. For example, while in the embodiment shown a difference in potential of given polarity is continuously across the signal conductors before use testing, it is also possible to impress an alternating voltage on the signal conductors. When applying relays to use an alternating voltage of sufficiently low frequency and to therewith use one half-wave, for example, the positive half-wave of the alternating voltage as use testing potential and to keep the potential after resulted use testing at the signal conductors on the voltage of the negative half-wave. Furthermore, it is not necessary that the free line signal potential and the busy potential as well have the same magnitude.

Consequently the breadth of this invention is to be construed as limited only by the spirit and scope of the appended claims.

What is claimed is:

1. Apparatus for transmitting messages by wire comprising, a plurality of like transmitting means, first and second conductors forming a transmission line, receiving apparatus coupled to said transmission line, each of said transmitting means including use testing means responsive to a free line signal potential across said first and second conductors for coupling the associated transmitting means to said transmission line to enable transmission of messages from the associated transmitting means to said receiving apparatus along said first and second conductors and responsive to a busy potential across said first and second conductors for maintaining the associated transmitting means decoupled from said transmission line, means for normally applying said free line signal potential of first polarity across said first and second conductors, means for activating each of said use testing means to couple the associated transmitting means to said transmission line when said free line signal potential is present, and means responsive to the coupling of a transmitting means to said transmission line for reversing the polarity of the potential across said first and second conductors to provide said busy potential, wherein said use testing means comprises holding relay means having a first normally open contact in series with the associated transmission means and one of said conductors, a test winding, a holding winding, and a second normally open contact, first and second unilaterally conducting means, means for coupling said first unilaterally conducting means and said test winding in series between said first and second conductors, and means for coupling said second unilaterally conducting means, said holding winding and said second normally open contact in series between said first and second conductors with said first and second unilaterally conducting devices oppositely poled.

2. Apparatus in accordance with claim 1 and further comprising, normaly open hook switch means for connecting said one conductor to said first unilaterally conducting device to energize said test winding and operate said test relay only when said free line signal potential is present upon closing said hook switch, said hook switch means being in series with said first normally open contact, said first and second unilaternally conducting devices being connected to the junction between said hook switch means and said first normally open contact.

3. Apparatus in accordance with claim 2 and further comprising, sources of first and second potentials of opposite polarity, busy auxiliary relay means having an auxiliary winding and first and second normally open auxiliary contacts, switching-in relay means having a switching winding and first and second normally closed switching contacts, means including said auxiliary winding and said first switching contacts for applying said first potential to said first conductor, means including said second switching contacts for applying said second potential to said second conductor, means including said switching winding and said first auxiliary contacts for applying said second potential to said first conductor, means including said second auxiliary contacts for applying said first potential to said second conductor, means responsive to closing of said hook switch means for energizing said auxiliary winding to operate said auxiliary relay and close said normally open first and second auxiliary contacts to energize said switching winding, and means for keeping said switching winding energized until said hook switch means is again opened.

4. Apparatus in accordance with claim 3 and further comprising, means for delaying the operation of said busy auxiliary relay upon closing of said hook switch means.

References Cited

UNITED STATES PATENTS 1,850,192 3/1932 Willis ............... 179—17

FOREIGN PATENTS 848,160 9/1960 Great Britain.
1,166,839 4/1964 Germany.

KATHLEEN H. CLAFFY, Primary Examiner

D. L. RAY, Assistant Examiner